United States Patent [19]
Siann et al.

[11] Patent Number: 5,406,306
[45] Date of Patent: Apr. 11, 1995

[54] SYSTEM FOR, AND METHOD OF DISPLAYING INFORMATION FROM A GRAPHICS MEMORY AND A VIDEO MEMORY ON A DISPLAY MONITOR

[75] Inventors: Jonathan I. Siann; Conrad M. Coffey, both of San Diego; Jeffrey L. Easley, Carlsbad, all of Calif.

[73] Assignee: Brooktree Corporation, San Diego, Calif.

[21] Appl. No.: 14,359

[22] Filed: Feb. 5, 1993

[51] Int. Cl.⁶ ............................................. G09G 1/14
[52] U.S. Cl. ................................. 345/115; 345/198; 348/589; 348/564
[58] Field of Search .................. 358/183, 22; 345/115, 345/132, 197, 198; 348/589, 564

[56] References Cited

U.S. PATENT DOCUMENTS

| | | | |
|---|---|---|---|
| 4,425,581 | 1/1984 | Schweppe | 345/115 |
| 4,947,257 | 8/1990 | Fernandez | 358/183 |
| 5,220,312 | 6/1993 | Lumelsky | 358/22 |
| 5,243,447 | 9/1993 | Bodenkamp | 348/589 |

FOREIGN PATENT DOCUMENTS

| | | |
|---|---|---|
| 0384257 | 8/1990 | European Pat. Off. |
| 0384419 | 8/1990 | European Pat. Off. |

OTHER PUBLICATIONS

Computer Technology Review, vol. 10, No. 14, Nov. 1990, Los Angeles US: pp.107–111 XP176674 T. Brunhoff.

Primary Examiner—Curtis Kuntz
Assistant Examiner—Minsun Oh
Attorney, Agent, or Firm—Ellsworth R. Roston; Charles H. Schwartz

[57] ABSTRACT

A display memory respectively stores, in first and second portions, digital graphics data for display in a video monitor and digital video data for display in a window in the monitor. The digital video data is transferred from the display memory to a shift register at a rate different from the pixel clock and from the shift register at a clock rate that may be lower than the pixel clock rate. The video data may be stored in a luminance and chrominance format and may be converted by a color space converter to 3 bytes representing the primary colors red, green and blue. The video pixels may then be interpolated to expand the number of video pixels. The shift register operation may be synchronized with such expansion so that data is not passed from the shift register until the expansion of previous data from the shift register has been completed. Video window logic provides for the passage of the graphics pixels through a digital multiplexer at the graphics clock rate at the monitor positions outside the window and the video pixels from the shift register through the colorspace converter and the interpolator at the monitor positions within the window. The graphics data may be delayed by a delay corresponding to that of the color space converter and the interpolator. The digital data passing through the multiplexer are latched at the graphics clock rate and are then converted to analog signals for display as a color image on the video monitor.

50 Claims, 3 Drawing Sheets

FIG. 1  PRIOR ART
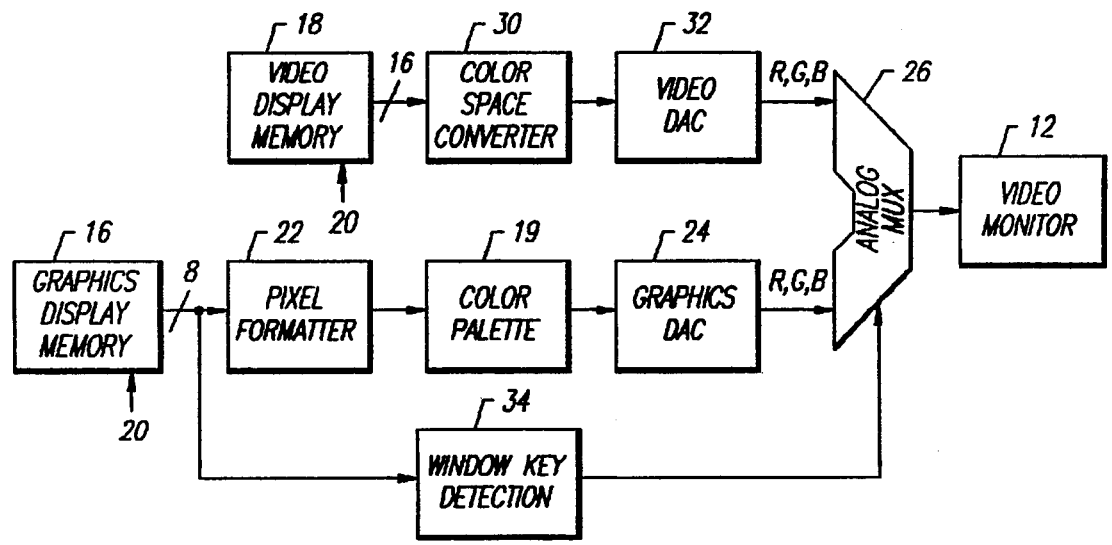
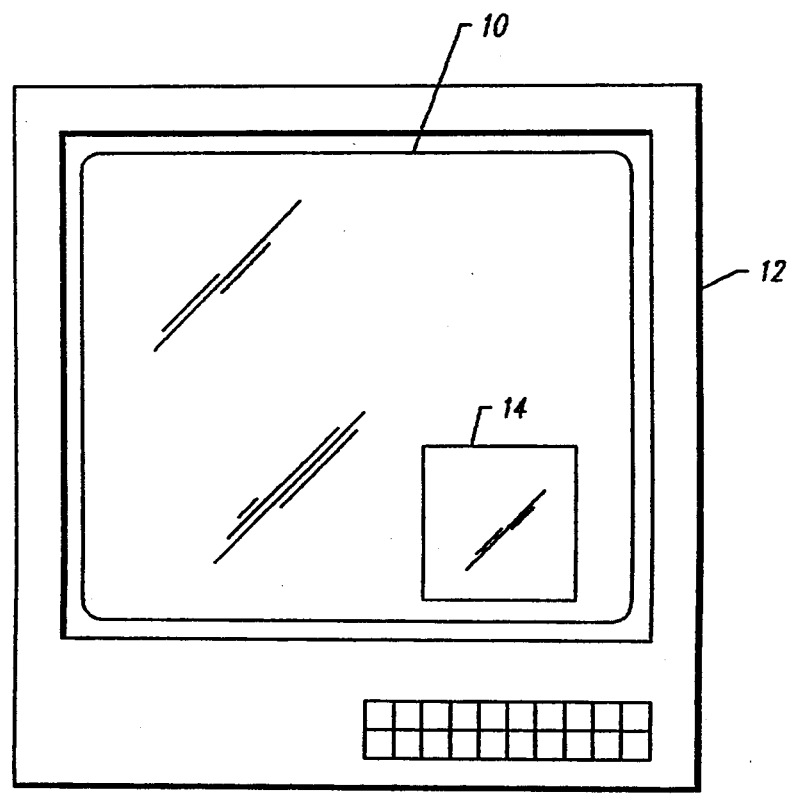
FIG. 2

| ADDRESS (8N+) | 0 | 1 | 2 | 3 | 4 | 5 | 6 | 7 | 8 | 9 | 10 |
|---|---|---|---|---|---|---|---|---|---|---|---|
| VALUE | Cb0 | Y0 | Cr0 | Y1 | Cb2 | Y2 | Cr2 | Y3 | Cb4 | Y4 | Cr4 |

FIG. 4

| PIXEL | 0 | 1 | 2 | 3 |
|---|---|---|---|---|
| Y | Y0 | Y1 | Y2 | Y3 |
| Cr | Cr0 | $\frac{Cr0+Cr2}{2}$ | Cr2 | $\frac{Cr2+Cr4}{2}$ |
| Cb | Cb0 | $\frac{Cb0+Cb2}{2}$ | Cb2 | $\frac{Cb2+Cb4}{2}$ |

FIG. 5

| ADDRESS (8N+) | 0 | 1 | 2 | 3 | 4 | 5 | 6 | 7 |
|---|---|---|---|---|---|---|---|---|
| VALUE | Cb0 | Y0 | Cr0 | Y2 | Cb4 | Y4 | Cr4 | Y6 |

FIG. 6

| PIXEL | 0 | 1 | 2 | 3 | 4 | 5 | 6 | 7 |
|---|---|---|---|---|---|---|---|---|
| Y | Y0 | $\frac{Y0+Y2}{2}$ | Y2 | $\frac{Y2+Y4}{2}$ | Y4 | $\frac{Y4+Y6}{2}$ | Y6 | $\frac{Y6+Y8}{2}$ |
| Cr | Cr0 | $\frac{3Cr0+Cr4}{4}$ | $\frac{Cr0+Cr4}{2}$ | $\frac{Cr0+3Cr4}{4}$ | Cr4 | $\frac{3Cr4+Cr8}{4}$ | $\frac{Cr4+Cr8}{2}$ | $\frac{Cr4+3Cr8}{4}$ |
| Cb | Cb0 | $\frac{3Cb0+Cb4}{4}$ | $\frac{Cb0+Cb4}{2}$ | $\frac{Cb0+3Cb4}{4}$ | Cb4 | $\frac{3Cb4+Cb8}{4}$ | $\frac{Cb4+Cb8}{2}$ | $\frac{Cb4+3Cb8}{4}$ |

FIG. 7

SYSTEM FOR, AND METHOD OF DISPLAYING INFORMATION FROM A GRAPHICS MEMORY AND A VIDEO MEMORY ON A DISPLAY MONITOR

This invention relates to apparatus for, and methods of, displaying color images on a video monitor. More particularly, the invention relates to apparatus for, and methods of, displaying a graphics color image and digital video color image on a video monitor, the video color image being displayed in a window on the video monitor.

Personal computers and work stations provide color image displays on a video monitor. In recent years, the designs of the personal computers and work stations have been advanced such that more than one image has been simultaneously displayed on the video monitor. For example, a first image has been displayed at a primary portion of the video monitor and a second image has been displayed in a small portion of the video monitor known as a window.

The first image has been a digital graphics image stored in a first display memory, generally consisting of eight (8) planes of data. The second image has been a digital video image stored in a second display memory generally consisting of sixteen (16) planes of color data. The cost of the one (1) megabyte display memory for the graphics information has been approximately forty dollars ($40) and the cost of the two (2) megabyte display memory for the video information has been approximately eighty dollars ($80) since the video memory has had twice as many planes as the graphics memory.

The digital video data stored in the video memory has been processed at the same frequency as the digital graphics pixels stored in the graphics memory. Generally this processing has been at the graphics clock rate. This has required the video data to be at the graphics clock rate. This is so even though the frequency components of the video image data are generally lower than the graphics image frequency.

As will be seen, the systems of the prior art have had certain significant limitations. One limitation has been the cost of providing two (2) different memories, particularly the cost of the video display memory since its cost has been twice that of the graphics display memory. Another limitation has been the need to digitize the video data at the graphics clock frequency.

The limitations discussed in the previous paragraph have been appreciated for some time. A significant effort has been made, and significant amounts of money have been expended in such effort, to provide a system which will overcome such limitations. In spite of such effort and such expenditures of money, a satisfactory system to overcome such limitations in simultaneously displaying a graphics image and a video image on a display monitor has not been provided.

In one embodiment of the invention, a display memory respectively stores, in first and second portions, digital graphics pixels for display in a video monitor and digital video data for display in a window in the monitor. The video data is transferred from the display memory to a shift register at a transfer clock rate different from (e.g. higher than) the pixel clock rate and out of the shift register at an output clock rate different from (e.g. lower than) the pixel clock rate.

The digital video data may indicate luminance and chrominance and may be converted by a color space converter to pixels representing the primary colors red, green and blue. The video pixels may then be interpolated to expand the number of video pixels. The shift register operation may be synchronized with such interpolation so that data is not output from the shift register until the interpolation of previous data from the shift register has been completed.

Video window logic provides for the passage through a multiplexer at the graphics clock rate of the graphics pixels at the monitor pixel positions outside the window and the video pixels from the shift register through the colorspace converter and the interpolator at the monitor pixel positions within the window. The graphics pixels may be delayed by a time corresponding to the video data delay through the color space converter and the interpolator. The multiplexed data passing through the multiplexer are latched at the graphics clock rate and are then converted to analog form by a digital-to-analog converter for display as a color image on the video monitor.

In the drawings:

FIG. 1 is a schematic block diagram of a prior art system for storing a video image on a first display memory and a graphics image on a second display memory and for displaying the graphics image as a primary image at a video monitor and the video image at a window in the video monitor;

FIG. 2 is a schematic diagram of the face of a video monitor for displaying the graphics and video images and illustrates a window on the face of the video monitor for displaying the video image;

FIG. 4 is a chart illustrating how binary data representing luminance and the two (2) components of chrominance may be recorded in a compressed format for the digital video image stored in a portion of the display memory shown in FIG. 3;

FIG. 5 is a chart illustrating how the compressed binary data from the chart shown in FIG. 4 may be expanded to reconstruct the color information for display at a window on the face of a video monitor;

Figure 3:
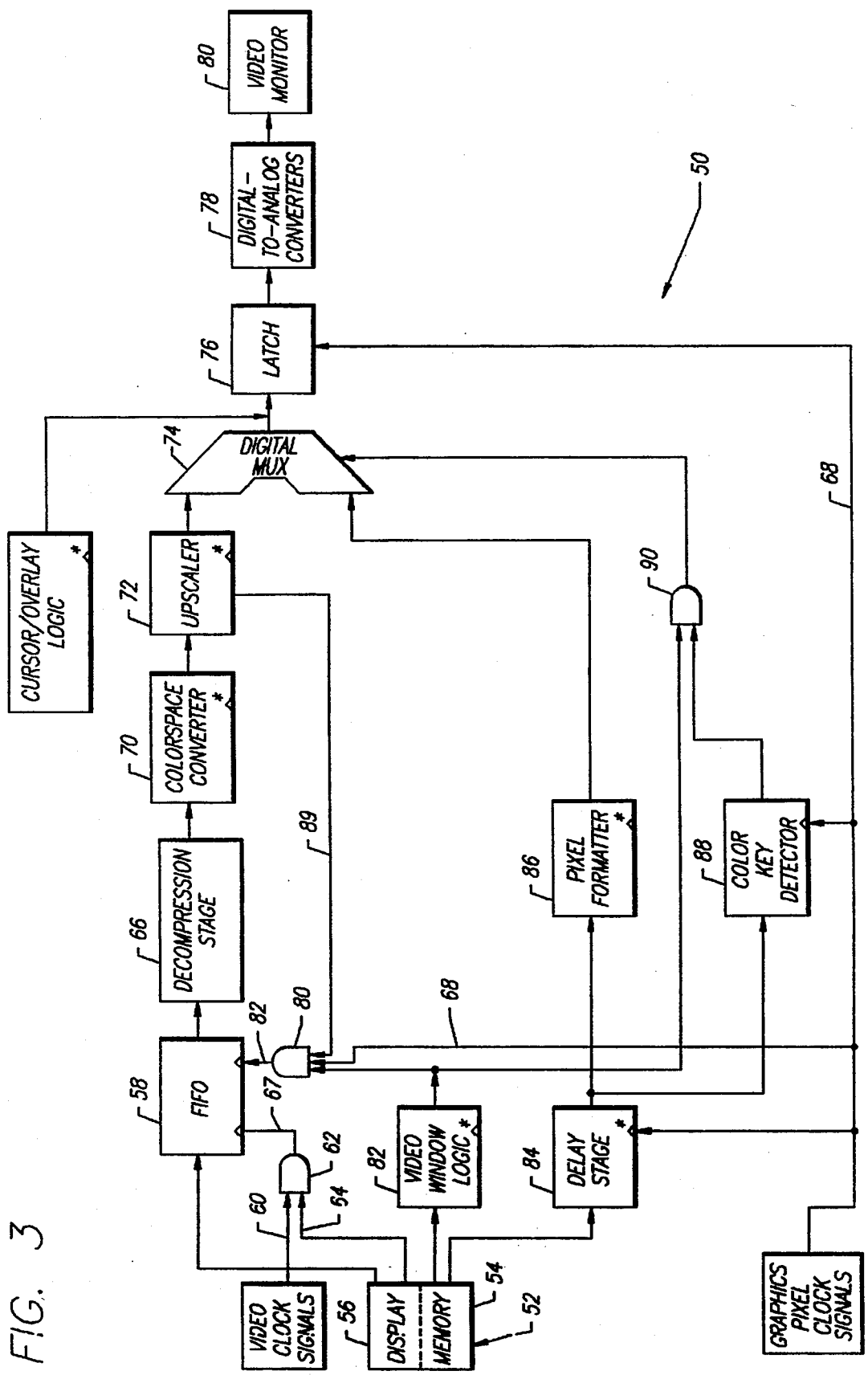
FIG. 3 is a schematic block diagram of a system constituting one embodiment of this invention for displaying a graphics image as a primary image on a face of the video monitor and a video image at a window on such face.

FIG. 6 is a chart illustrating how binary indications representing luminance and the two (2) components of chrominance may be recorded, in an even more compressed form than in the chart shown in FIG. 4, in a portion of the display memory shown in FIG. 3; and FIG. 7 is a chart illustrating how the highly compressed binary data from the chart shown in FIG. 6 may be expanded to reconstruct the color information for display at a window on the face of a video monitor.

FIG. 2 illustrates a face 10 of a video monitor 12 for displaying a visual image. The visual image may primarily be displayed on the face 10 of the video monitor 12 from a graphics memory but a video image may be displayed in a window 14 on the face of the video monitor from a video memory. It will be appreciated that more than one (1) window 14 may be displayed on the face 10 of the video monitor 12. The image in the window 14 may or may not be related to the primary image from the graphics memory.

FIG. 1 is a schematic block diagram of a prior art system for displaying on the face 10 of the video monitor 12 a graphics image recorded in a display memory 16 and for displaying, in the window 14 on the face 10, a video image recorded in a display memory 18. The display memory 16 may be a conventional one (1) megabyte memory. The memory 16 may have eight (8) planes to record one byte per pixel, each byte having eight (8) binary bits. The memory 18 may require two (2) megabytes. The memory 18 may have sixteen (16) planes to record two bytes per pixel, each byte also having eight (8) binary bits. Each of the display memories 16 and 18 may record information for ten hundred and twenty four (1024) pixels in a horizontal line on the face 10 of the video monitor 12 and for seven hundred and sixty eight (768) horizontal lines on such face.

The graphics data in the display memory 16 may be recorded in a form where a separate byte records information for each primary color. Thus, separate bytes for the primary colors red, green and blue may be required for each individual pixel. Alternatively, two (2) bytes of indications may be used for the three (3) primary colors in a 5:5:5 pattern of binary bits or in a 5:6:5 pattern of binary bits. In all of such formats, the colors stored represent true colors in the graphics image.

Alternately, a single byte of eight (8) binary bits may represent only two hundred and fifty six (256) possible colors to be selected from a different position in a color palette or lookup table 19. A different palette output color is stored in three bytes at each of the individual positions of the color palette 19. For example, the output color stored at each individual position in the color palette 19 may provide eight (8) bits representing the primary color red, eight (8) bits representing the primary color blue and eight (8) bits representing the primary color green. The three (3) color bytes stored at each individual position in the color palette 19 represent pseudo-colors. The digital video data stored in the display memory 18 may provide luminance and chrominance information. The two bytes of stored data for each input video pixel may include a plurality of binary bits providing luminance information and two (2) pluralities of binary bits respectively providing information relating to two (2) separate components of chrominance. These components of chrominance may have a quadrature relationship to each other.

The bytes of data in the display memory 16 are read from the memory in the system of the prior art at a graphics pixel rate dependent upon a clock input on a line 20. The bytes of information from the display memory 16 are introduced to a pixel formatter 22 which converts the stored data for each primary color in each pixel to three (3) bytes, each of eight (8) bits if the data for such primary color in such pixel are less than eight (8) bits. The three bytes of color data from the pixel formatter 22 are then introduced to three digital-to-analog converters (DACs) 24 for conversion to analog signals representing the primary colors if the indications are in true colors. If the graphics data is stored in pseudo colors, the signals from the pixel formatter 22 are introduced to the color palette 19, and the color palette true color outputs are introduced to the DACs 24. The analog signals from the DACs 24 then pass through an analog multiplexer 26 for display on the face 10 of the video monitor 12.

The data output from the video display memory 18 in the system of the prior art are also clocked by the graphics pixel clock on the line 20. The video signals have been previously digitized at the graphics pixel clock frequency before being stored in the video display memory 18. The bytes of information from the display memory 18 are converted in a color space converter 30 to a form representing the primary colors red, green and blue. The binary indications from the converter 30 are converted to analog signals by digital-to-analog converters 32. The analog signals are passed through the analog multiplexer 26 at the positions of the window 14 on the face 10 of the video monitor 12.

The display of the color information from the video display memory 18 at the window 14 on the face 10 of the video monitor 12 is provided as a result of the operation of a window key detector 34. The window key detector 34 receives a specially coded binary word from the graphics display memory 16 at the positions of the window 14 to prevent information in the graphics display memory 16 from passing through the multiplexer 26 and to provide for the passage of the color information from the video display memory 18 through the multiplexer.

The prior art system shown in FIG. 1 has certain significant limitations or disadvantages. One limitation is that two separate display memories have to be used, one (the display memory 16) to store the graphics image and the other (the display memory 18) to store the video image. Furthermore, the display memory 18 has sixteen (16) planes. This considerably increases the cost of the system of the prior art. For example, the cost at present of the display memory 16 is approximately forty dollars ($40) and the cost at present of the display memory 18 is approximately eighty dollars ($80).

Another disadvantage of the prior art system shown in FIG. 1 is that the video color information frequency is generally much lower than the graphics clock rate. The prior art system requires the video information to be digitized at the graphics clock rate. This results in much redundant or wasted data. A further disadvantage has been that the binary information has been converted to analog information before being introduced to the multiplexer 26 so that the multiplexer has passed analog information. This has added distortion to the color image displayed on the face 12 of the video monitor 10. This has limited the resolution of the color image recorded on the face 10 of the video monitor 12.

There are other disadvantages to the prior art system shown in FIG. 1 and described above. For example, the system requires two (2) processors, one (1) for the video and the other for the graphics, and also requires two (2) sets of digital to analog converters, one (1) for the video and the other for the graphics. The architecture also limits the performance of such systems because speed limitations in the analog multiplexer 26 often restrict resolutions to a maximum of 1024×768 pixels.

FIG. 3 shows a block diagram of a system generally indicated at 50 and constituting one embodiment of the invention. The system 50 includes a display memory generally indicated at 52, which may be a conventional memory having eight (8) planes and having the capacity of storing approximately one (1) megabyte of information. The display memory 52 may have a first portion 54 for storing graphics information and a second portion 56 for storing video information. The graphics information stored in the portion 54 of the display memory 52 provides the data for the pixels on the face 10 of the video monitor 12 outside of the window 14 and also provides coded data signals at the pixel positions within the window 14 for insuring that the video information in the portion 56 of the display memory 52 will be displayed in the window.

The video information stored in the portion 56 of the display memory 52 provides input data to generate the color pixels in the window 14 on the face 10 of the video monitor 12. The video information stored in binary form in the portion 56 may indicate the luminance and the two (2) quadrature components of chrominance for each pixel. The video information stored in binary form in the portion 56 of the display memory 52 may be in a compressed form which may be decompressed to provide 320 video pixels in each of 240 lines. The graphics information stored in the portion 54 of the memory 52 may be in the form of 1024 pixels stored for each of 768 lines.

The video data in the portion 56 of the display memory 52 is introduced to the input end of a shift register 58 at a rate of the video data clock signals on a line 60. The video data clock signals on the line 60 are introduced to an AND gate 62 as are the signals on a VALID line 64. The VALID line 64 provides signals on a time-sharing basis with other portions (not shown) of the system. The VALID line 64 provides a positive signal when information is to be shifted into the register 58. The output of the AND gate 62 clocks the shift register which shifts data into the left end of the register, and a clock line 82 outputs data from the right end of the shift register. Because of the two clocks, the shift register is designated in FIG. 3 as a "FIFO" to indicate that the data first input into the shift register will be the data first output from the register.

As previously indicated, the luminance and chrominance signals stored in the FIFO 58 may be compressed. FIG. 4 indicates one pattern of compression and FIG. 6 indicates another pattern of compression. In FIG. 4, successive bytes of indications in the portion 56 of the display memory 52 are indicated in the first horizontal row and are designated as "Address (8N+)". The consecutive bytes of data are designated with the successive Arabian numbers "0", "1", "2", "3", etc. The value recorded in each byte are indicated in the second horizontal row and are designated as "VALUE". As will be seen, the successive byte values are designated as "Cb0", "Y0", "Cr0", "Y1", "Cb2", "Y2", "Cr2", "Y3", "Cb4", "Y4", "Cr4". This represents some compression of information since illustratively Cb1, Cr1, Cb3 and Cr3 are not stored in the successive bytes in the portion 56 of the display memory 52.

In the pattern shown in FIG. 4, Y represents a byte of luminance information. Thus, successive bytes of luminance are designated as Y0, Y1, Y2, Y3, etc. Also in the pattern shown in FIG. 4, "Cb" represents one of the two (2) quadrature components of the chrominance information and "Cr" represents the other quadrature component of the chrominance information. Thus, Cb0, Cb1, Cb2, etc., represent successive bytes of the first chrominance component and Cr0, Cr1, Cr2, etc. represent successive bytes of the second chrominance component. If 320 pixels are stored for each line of video data, it will be appreciated that the compression format of FIG. 4 requires 640 bytes of data in the display memory.

FIG. 5 indicates how the data recorded in the portion 56 of the display memory 52 are decompressed to reconstruct the color information in each successive video pixel. In the first row, the successive video pixels are designated as "0", "1", "2", "3", etc. The first column of the first row is designated as "PIXEL" to indicate that the successive values in that row indicate the number of the pixel. The first column in the second (2d), third (3rd) and fourth (4th) rows in FIG. 5 indicate that these rows respectively provide the luminance byte and the two (2) chrominance bytes.

As will be seen in FIG. 5, the luminance information in the second row for the successive bytes corresponds to the successive luminance bytes Y0, Y1, Y2, Y3, etc. The chrominance information for alternate pixels corresponds to the chrominance bytes for such pixels. Thus, the chrominance information for the first (1st) pixel is respectively indicated in the third (3rd) and fourth (4th) rows in FIG. 5 by the Cb0 and Cr0 bytes and the chrominance for the third (3rd) pixel is respectively indicated in the third (3d) and fourth (4th) rows in FIG. 5 by the Cb2 and Cr2 bytes. However, the chrominance information for the second (2d) pixel is obtained by averaging the chrominance bytes for the first (1st) and third (3d) pixels $$\left( \frac{Cb0 + Cb2}{2}, \frac{Cr0 + Cr2}{2} \right).$$

Similarly, the chrominance information for the fourth (4th) pixel is obtained by averaging the chrominance bytes for the third (3d) and fifth (5th) pixels.

$$\left( \frac{Cb2 + C4}{2}, \frac{Cr2 + Cr4}{2} \right).$$

FIG. 6 provides a pattern with a greater compression than that shown in FIG. 4. In FIG. 6, the bytes of luminance (Y0, Y2, Y4, Y6, etc.) in alternate pixels are recorded in alternate positions in the portion 56 of the display memory 52. In the other alternate positions, the two (2) components of chrominance in the first (1st), fifth (5th) and ninth (9th) pixels are recorded. Thus, the successive bytes of indications recorded in the portion 56 of the display memory 52 have the pattern Cb0, Y0, Cr0, Y2, Cb4, Y4, Cr4, Y6, etc. If 320 pixels are stored for each line of video data, it will be appreciated that the compression format of FIG. 6 requires only 320 bytes of data in the display memory.

FIG. 7 indicates how the data recorded in the portion 56 of the display memory 52 in the format of FIG. 4 is decompressed. As will be seen, the luminance for the successive pixels is obtained by first providing the luminance value for the first pixel and then obtaining the next luminance value and averaging the luminance for that pixel and the luminance value for the pixel two (2) removed from that pixel. Thus, the luminance indications for the successive pixels are indicated by the pattern $$Y0, \frac{Y0 + Y2}{2}, Y2, \frac{Y2 + Y4}{2}, \text{etc.}$$

The chrominance indications for each group of four (4) pixels are obtained by providing the chrominance value for the first pixel and then obtaining the next chrominance value in the fifth pixel and providing progressive weighted averages of the chrominance indications for the first pixel and the chrominance indications for the fifth (5th) pixel. Thus, the chrominance bytes for one of the two (2) components are obtained for four (4) successive pixels by the following weighted sequence:

$$Cr0, \frac{3Cr0 + Cr4}{4}, \frac{Cr0 + Cr4}{2}, \frac{Cr0 + 3Cr4}{4}.$$

Similarly, the chrominance bytes for the other component are obtained in the following sequence:

$$Cr0, \frac{3Cr0 + Cr4}{4}, \frac{Cr0 + Cr4}{2}, \frac{Cr0 + 3Cr4}{4}.$$

It will be appreciated that greater compressions of luminance and chrominance information can be provided than those expressed in FIGS. 4 and 6. When these increased compressions are used, the decompressions become more complicated than those shown in FIGS. 5 and 7. In each of these increased compressions and the resultant decompressions, the patterns of bytes representing luminance and chrominances from successive pixels are provided in a repetitive pattern.

The bytes of video information stored in the FIFO 58 as in the pattern shown in FIG. 4 or in the pattern shown in FIG. 6 are decompressed in a decompression stage 66 as in the pattern shown in FIG. 5 or in the pattern shown in FIG. 7. This decompression is provided at a rate of the graphics clock signals passing through a line 68. The bytes of information from the decompression stage 66 are then converted in a colorspace converter 70 to three (3) bytes, each representing the primary colors red, green and blue. This conversion occurs at the graphics clock rate. Each of these bytes may have eight (8) binary bits. The colorspace converter 70 is well known in the art. The colorspace converter 70 may not have to be included if the bytes in the FIFO 58 represent the primary colors red, green and blue.

The information bytes from the color space converter 70 then pass to an upscaler stage 72 which interpolates the bytes at the graphics clock rate to provide additional pixels between the pixels represented by the bytes of information from the color space converter 70. By providing this interpolation, the upscaler 72 can produce up to 1024 pixels from the 320 pixels in each of the pixels representing a line in the portion 56 of the display memory 52. The upscaler 72 is well known in the art. It does not have to be included if an interpolation does not have to be provided of the video bytes of information.

The information bytes from the upscaler 70 are then passed through a digital multiplexer 74 to a latch 76. The latch 76 may constitute registers which latch information for presentation to digital-to-analog converters 78 in synchronism with the graphics clock signals on the line 68. The analog voltage indications of the red, green, and blue components of successive pixels are introduced to the video monitor 12 to provide a color image at the window 14 on the face 10 of the video monitor.

Because the upscaler 72 typically produces more than one output pixel for each input pixel, it should have a control line that prevents the introduction of new input pixels until they are required to produce more output pixels. The upscaler, therefore, provides a logic 0 or "busy" signal on a line 89 to the AND gate 80 when necessary. The AND gate 80 also receives the graphics clock signals on the line 68 and control signals from video window logic 82. The control signals from the window logic 82 are color key data provided from the portion 54 of the display memory 52 to indicate that the pixel positions in the window 14 on the face 10 of the display monitor 12 should be video, not graphics, pixels.

Thus, when the upscaler 72 has completed the interpolation of pixel information from the colorspace converter 70 during the presentation of the color image in the window 14 on the face 10 of the video monitor 12, a logic "1" signal passes through the line 89 to the AND gate 80, thus enabling the graphics clock signals on the line 68 to clock additional bytes of video data from the FIFO 58.

The bytes of the graphics color data stored in the portion 54 of the display register 52 are introduced to a delay stage 84 which re-clocks the data in synchronism with the graphics pixel clock signals on the line 68 to compensate for the delays provided by the decompression stage 66, the colorspace converter 70 and the upscaler 72. The bytes of graphics data are then introduced to a pixel formatter which converts the data to three (3) bytes representing the primary colors red, green and blue, each byte having eight (8) bits. The pixel formatter 86 may include a color palette 19 or look-up table (FIG. 1) which is well known in the art and which decoder the delayed bytes of information from the portion 54 of the display memory 52 to select a particular position in the look-up table.

Alternatively, the delayed bytes of information from the portion 54 of the display memory 52 may represent true colors. The pixel formatter 86 may then operate to convert less than eight (8) stored bits for each of the primary colors red, green and blue to eight (8) stored bits for each of such colors. The digital output of the pixel formatter 86 passes through the digital multiplexer 74 to the latch 76 for conversion to analog signals at the graphics clock rate. If the number of bits in each stored color is eight (8) and each stored color represents one of the primary colors for a pixel, the pixel formatter 86 may not have to be included.

The stored graphics data pass from the delay stage 84 to a color key detector 88 in synchronism with the graphics pixel clock signals on the line 68. The color key detector 88 recognizes a specific bit pattern which determines that a pixel is within the window 14 on the face 10 of the video monitor 12. When the pattern indicates that a pixel is within the window 14, a signal passes from the color key detector 88 to an AND gate 90. The AND gate 90 also receives signals from the video window logic 82 to indicate that a pixel is within the window 14. A signal then passes through the AND network 90 to the multiplexer 74 to prevent graphics data from passing through the multiplexer from the pixel formatter 86 and to provide for the passage of video data from the upscaler 72 through the multiplexer.

It will be appreciated that the display memory 52 and the video monitor 12 may be provided as separate items and that all of the other stages shown in FIG. 3 and described above may be provided on a single integrated circuit chip. This chip may be formed by CMOS technology. It will also be appreciated that the video data stored in the portion 56 of the display memory 52 may have different formats than that specified above. In these different formats, one or more of the decompression stage 66, the colorspace converter 70 and the upscaler 72 may be eliminated. Upon the elimination of one or more of these stages, the delay provided by the delay stage 84 may be adjusted to compensate for the delay in the conversion of the video data from the FIFO 58 to a format suitable for passage through the multiplexer 74.

The system shown in FIG. 3 and described above has certain important advantages. It provides high resolution video and graphics information in a single display memory 52. Furthermore, the display memory 52 may have only eight (8) planes. This represents a considerable savings over the systems of the prior art since the systems of the prior art have required two (2) display memories and one of these display memories has had sixteen (16) planes. The system shown in FIG. 3 and described above is also advantageous in that the complete system, other than the display memory 52 and the video monitor 12, can be disposed on a single integrated circuit chip.

The system shown in FIG. 3 and described above also has other important advantages. For example, it allows the video data to be stored in the portion 56 of the display memory 52 without any change from the format in which it has been generated. This allows compressed video data to be transferred from the portion 56 of the display memory 52 at an average clock rate which is as low as the video clock rate. The data is then processed on the integrated circuit chip at the graphics clock rate.

Furthermore, the processing of the video information and also of the graphics information occurs using digital circuitry. The video and graphics data are converted to analog form only after they have been processed and passed through the multiplexer 74 to the latch 76. This allows a considerably more sophisticated and precise processing of the information, as in the decompression stage 66, the colorspace converter 70 and the upscaler 72, than if the information were immediately converted to analog information as in the prior art.

Actually, when the display memory 52 has a one (1) megabyte capacity, the graphics portion is stored in approximately seventy five percent (75%) of the memory. A 340×240, 16-bit video window requires approximately only 150,000 bytes of memory. It is accordingly possible to store video information for two (2) video windows in the display memory 52.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for displaying visual information on a video monitor,
   a display memory having a first portion for storing graphics pixels and a second portion for storing video pixels,
   first means for reading the stored graphics pixels at a first frequency,
   second means for reading and storing the stored video pixels at a second frequency different from to the first frequency,
   control logic means for providing control information to control the introduction of the stored graphic pixels and the stored video pixels to the video monitor to provide for the production on a first portion of the video monitor of the visual information represented by the graphic pixels and for the production on a second portion of the video monitor of the video information represented by the video pixels,
   third means for passing the stored video pixels from the second means at the first frequency,
   fourth means responsive to the control information from the control logic means for presenting the visual information represented by the graphics pixels in the display memory to the first portion of the video monitor and for presenting the visual information represented by the video pixels from the third means to the second portion of the video monitor.

2. In a combination as set forth in claim 1,
   the display memory storing the graphics and video information in binary form,
   the fourth means presenting in binary form the visual information represented by the graphics pixels from the first means and by the video pixels from the third means.

3. In a combination as set forth in claim 2,
   the video pixels being stored in the display memory and in the second means in the form of luminance and chrominance information and being passed from the third means in the form of the luminance and chrominance information, and
   means for converting the video pixels from the third means at the first frequency to video information representing the primary colors red, green and blue at the first frequency before introduction of the video information to the fourth means.

4. In a combination as set forth in claim 1 including
   fifth means for presenting in sequence the indications representing the video pixels and the fourth means being responsive to the control information from the control logic means and to the video information from the third means to present the indications in sequence from the third means to the video monitor as a window in the video monitor.

5. In combination for displaying visual information on a video monitor,
   first means for providing stored video pixels at a first frequency,
   second means for providing stored graphics pixels at a second frequency different from and unrelated to the first frequency,
   shift register means,
   third means for introducing information from the first means into the shift register means at the first frequency for a particular window on the video monitor and for passing information from the shift register means at the second frequency,
   fourth means for providing indications at the second frequency of the positions of the window in the video monitor,
   fifth means for introducing pixels from the second means to the video monitor at the second frequency, and
   sixth means responsive to the indications from the fourth means for introducing the indications from the shift register means to the video monitor at the second frequency.

6. In a combination as set forth in claim 5,
   the first means and the second means constituting different portions of a single display memory.

7. In a combination as set forth in claim 6,
   the shift register means receiving, at one end of the shift register means, the indications from the first means at the first frequency and introducing the indications, from the other end of the shift register means, to the video monitor at the second frequency.

8. In a combination as set forth in claim 7,
a multiplexer connected to the shift register means and the second means and the sixth means responsive to the indications from the fourth means for passing the pixel indications from the shift register means in the pixel positions of the window in the video monitor, and
means responsive to the indications passing through the multiplexer means for latching such indications at the second frequency.

9. In combination for displaying video information on a video monitor from first display memory means storing video pixel indications and second display memory means storing graphics pixel indications,
shift register means for receiving at a first frequency the pixel indications to be displayed in a window on the video monitor,
first means for introducing the video pixel indications from the first display memory means to the shift register means at the first frequency for the window in the video monitor,
second means for providing the pixel indications from the second display memory means at a second frequency different from the first frequency,
video window logic means for providing for a controlled passage at the second frequency of the pixel indications from the second means for the pixel positions other than the pixel positions in the window and for providing for a controlled passage of the pixel indications from the shift register means at the second frequency for the window, and
third means operatively coupled to the video logic means for passing at the second frequency the pixel indications from the second means for the pixel positions other than the pixel positions in the window and for passing at the second frequency the pixel indications in the shift register means for the pixel positions in the window.

10. In a combination as set forth in claim 9,
the video pixel indications being provided with luminance and chrominance indications to represent color,
means for converting the luminance and chrominance indications for the video pixels to indications representing the primary colors red, green and blue for the video pixel indications after the passage of such indications from the shift register means and before the operation of the third means on such pixel indications, and
the graphics pixels being provided with indications representing the primary colors red, green and blue.

11. In a combination as set forth in claim 10,
means for delaying the introduction of the pixel indications from the second means to the third means in accordance with the delay provided by the conversion of the luminance and chrominance indications for each pixel position to the indications of the primary colors red, green and blue.

12. In a combination as set forth in claim 9,
means for providing clock signals at the second frequency, and
means for latching the indications from the third means in accordance with the occurrence of the clock signals at the second frequency.

13. In combination for displaying visual information on a video monitor,
a display memory,
there being first pixels recorded in the display memory to represent graphics pixels,
there being second pixels recorded in the display memory to represent video pixels for display in a window on the video monitor, the video pixels being recorded in the display memory in a different format than the graphics pixels,
first means for providing the video pixels from the display memory at a first frequency,
second means for providing the graphics pixels from the display memory at a second frequency different from the first frequency,
shift register means,
third means for shifting into the shift register means the video pixels from the display memory at the first frequency, and fourth means for providing for the passage of the graphics pixels from the display memory at the second frequency at the pixel positions in the video monitor other than the positions in the window and for the passage of the video pixels from the shift register means at the second frequency at the positions of the window.

14. In a combination as set forth in claim 13,
the video pixels being recorded in the display memory to represent chrominance and luminance and the graphics pixels being recorded in the display memory to represent the primary colors red, green and blue, and
means responsive to the pixels from the shift register means at the second frequency for converting the pixels representing the chrominance and the luminance of the video pixels to pixels representing the primary colors red, green and blue at the second frequency before the operation of the fourth means in passing the graphics and video pixels.

15. In a combination as set forth in claim 14,
the video pixels being recorded in a compressed format, and
means responsive to the passage of the video pixels from the shift register means for decompressing the video pixels before the operation of the fourth means in passing the video pixels.

16. In a combination as set forth in claim 13,
a multiplexer,
the fourth means including the multiplexer for providing for the passage through the multiplexer of the graphics pixels from the display memory at the second frequency at the pixel positions in the video monitor other than the positions in the window and the passage through the multiplexer of the video pixels from the shift register means at the second frequency at the positions of the window.

17. In a combination as set forth in claim 16,
the graphics pixels and the video pixels being recorded in the display memory in binary form,
the graphics and video pixels passing through the multiplexer being in binary form, and
means for converting the graphics and video pixels passing through the multiplexer into analog indications of color for display on the video monitor.

18. In combination for displaying visual information on a video monitor,
a display memory having a first portion for storing graphics information in binary form and having a second portion for storing video information in binary form, shift register means for receiving the video information at a first frequency in the second portion of the display memory, first means for providing for the passage of the graphics information from the first portion of the display memory at a second frequency different from to the first frequency, second means for providing for the passage of the video information from the shift register means at the second frequency, and third means operatively coupled to the first and second means for providing for a display of the graphics information on a first portion of the video monitor at the second frequency and for a display of the video information on a second portion of the video monitor at the second frequency.

19. In a combination as set forth in claim 18, the third means being operative to prevent the video information from passing from the shift register means in the first portion of the video monitor and to prevent the graphics information from passing from the first portion of the display monitor in the second portion of the video monitor.

20. In a combination as set forth in claim 19, the third means including a multiplexer for passing the graphics information from the first portion of the display memory at the second frequency in the pixel positions corresponding to the first portion of the video monitor and for passing the video information from the shift register means at the second frequency in the pixel positions corresponding to the second portion of the video monitor and including means for converting the graphics and video information passing through the multiplexer in binary form at the second frequency into corresponding analog information for display on the video monitor.

21. In a combination as set forth in claim 20, the video information in the second portion of the display memory being in a form representing the luminance and the chrominance of different pixels, and the third means including means for converting the luminance and chrominance indications for the different pixels into a form representing the primary colors for the different pixels.

22. In combination for displaying visual information on the face of a video monitor, first means for providing video information at a first frequency, second means for providing graphics information at a second frequency different from and unrelated to the first frequency, shift register means, means for providing for the passage of the video information from the first means into the shift register means at the first frequency, means for providing for the passage of the video information from the shift register means at the second frequency, multiplexer means operatively coupled to the second means and the shift register means for selectively passing the graphics information from the second means at the second frequency and the video information from the shift register means at the second frequency, and video logic means operatively coupled to the multiplexer means for providing for the passage through the multiplexer means of the graphics information from the second means at the second frequency in a first portion of the face of the video monitor and the passage through the multiplexer means of the video information from the shift register means at the second frequency in a second portion of the face of the video monitor.

23. In a combination as set forth in claim 22, the second means providing the video information in the form of luminance and chrominance, and means operatively coupled to the shift register means for converting at the second frequency the luminance and chrominance information to video information representing the primary colors red, green and blue after the passage of such video information from the shift register means at the second frequency but before the introduction of the video information to the multiplexer means.

24. In a combination as set forth in claim 22, the video information in the first means being in binary form, the graphics information in the second means being in binary form, and means responsive to the graphics and video information passing through the multiplexer means for converting such information to corresponding analog indications for display on the face of the video monitor.

25. In a combination as set forth in claim 24, means for interpolating the video information after the passage of the video information from the shift register means at the second frequency but before the introduction of the video information to the multiplexer means.

26. In combination for providing a visual display on the face of a video monitor, first means for providing stored video pixels in binary form at a first frequency, second means for providing stored graphics pixels in binary form at a second frequency different from to the first frequency, third means having first and second ends for receiving the video pixels in binary form at the first frequency at the first end and for sequentially shifting the pixels through the third means in accordance with the introduction of additional ones of the video pixels to the first end of the third means, fourth means for providing for the introduction of the video pixels from the first means to the first end of the third means at the first frequency, fifth means for providing for the passage of the video pixels from the second end of the third means at the second frequency, video logic means for controlling the passage of the video pixels from the second end of the third means at first pixel positions on the face of the video monitor and the passage of the graphics pixels from the second means at second pixel positions on the face of the video monitor, and multiplexer means responsive to the video logic means for providing for the passage of the video pixels from the second end of the third means at the second frequency at the first positions on the face of the video monitor and for providing for the passage of the graphics pixels from the second means at the second frequency at the second pixels on the face of the video monitor.

27. In a combination as set forth in claim 26,
means responsive to the video and graphics pixels passing through the multiplexer means in binary form for converting such pixels to analog signals representing such pixels, and
means for introducing such analog signals to the video monitor for display on the face of the video monitor of the image represented by such analog signals.

28. In a combination as set forth in claim 26,
the first means storing the video pixels in a binary form indicative of luminance and chrominance,
sixth means for converting the video pixels from the second end of the third means at the second frequency to a binary form indicative of the primary colors red, green and blue and for introducing to the multiplexer means the indications of the video pixels in the primary colors red, green and blue at the second frequency,
the second means storing the graphics pixels in a form representing the primary colors red, green and blue and introducing to the multiplexer means at the second frequency the graphics pixels in the form representing the primary colors red, green and blue.

29. In a combination as set forth in claim 26,
the first means storing, in a compressed binary format at the first frequency, video pixels indicative of luminance and chrominance,
sixth means for decompressing the video pixels in the compressed binary format from the second end of the third means and seventh means for converting the decompressed video pixels from the second end of the third means to a binary form indicative of the primary colors red, green and blue,
the multiplexer means receiving the video pixels in the binary form indicative of the primary colors red, green and blue,
the second means storing the graphics pixels at the second frequency in a binary form indicative of the primary colors red, green and blue.

30. In a combination as set forth in claim 29,
means responsive to the video and graphics pixels passing through the multiplexer means in the binary form indicative of the primary colors red, green and blue for converting such pixels to analog signals representing such pixels, and
means for introducing such analog signals to the video monitor for display on the face of the video monitor of the image represented by such analog signals.

31. In combination for displaying visual information on the face of a video monitor,
a display memory for storing video pixels in a binary form on a first portion of the display memory and for storing graphics pixels in a binary form on a second portion of the display memory,
shift register means,
first means for transferring the stored video pixels to the shift register means at a first frequency,
second means for transferring the video pixels from the shift register means at a second frequency different from the first frequency, and
video logic means for providing for a controlled transfer by the second means at the second frequency of the video pixels from the shift register means at particular pixel positions on the face of the video monitor.

32. In a combination as set forth in claim 31,
third means for interpolating the video pixels transferred from the shift register means by the second means at the second frequency to increase the number of pixels, and
fourth means responsive to the completion of each interpolation for providing for the introduction of additional video pixels from the shift register means to the third means at the second frequency.

33. In a combination as set forth in claim 31,
the display memory storing the video pixels frequency in a format representing luminance and chrominance, and
third means for converting at the second frequency the video pixels in the format representing luminance and chrominance to a form representing the primary colors red, green and blue at the second frequency after the transfer of the video pixels from the shift register means by the second means at the second frequency.

34. In a combination as set forth in claim 33,
fourth means for interpolating the video pixels from the third means to increase the number of such pixels,
fifth means responsive to each completion of the interpolation of the video pixels for providing for the introduction of additional video pixels from the shift register means to the fourth means for interpolation, and
sixth means responsive to the video pixels from the fourth means for converting such video pixels to corresponding analog pixels for display on the video monitor.

35. In a combination as set forth in claim 34,
the display memory storing the video pixels in a first portion of the display memory and storing graphics pixels in a second portion of the display memory different from the first portion of the display memory,
seventh means for providing for the transfer of the graphics pixels from the display memory at the second frequency, and
the sixth means including multiplexer means for providing for the passage of the video pixels from the fourth means for the display of the image represented by such video pixels on a first portion of the face of the video monitor and for the passage of the graphics pixels from the seventh means for the display of the image represented by such graphics pixels on a second portion of the face of the video monitor different from the first portion of such face and including eighth means for converting to an analog form the video and analog pixels passing through the multiplexer means.

36. In a method of displaying visual information on the face of a video monitor, the steps of,
transferring stored video pixels at a first clock rate for display on a first portion of the face of the video monitor,
transferring graphics pixels at a second clock rate for display on a second portion of the face of the video monitor, the second clock rate being different from the first clock rate,
delaying the transferred stored video pixels,
transferring the delayed video pixels at the second clock rate, and providing for an introduction to the video monitor of the graphics pixels transferred at the second clock rate, at the pixel positions corresponding to the second portion of the face of the video monitor and an introduction of the delayed transferred video pixels to the video monitor at the second clock rate at the pixel positions corresponding to the first portion of the face of the video monitor.

37. In a method as set forth in claim 36 wherein the stored video and graphics pixels are in binary form and wherein the video and graphics pixels transferred at the second clock rate to the video monitor are converted to an analog form at the second clock rate before such transfer and wherein the visual information represented by the video and graphics pixels in the analog form are displayed on the face of the video monitor.

38. In a method as set forth in claim 37 wherein the delayed video pixels are interpolated at the second clock rate to increase the number of the video pixels and wherein each interpolation of the video pixels at the second clock rate is delayed until the previous interpolation has been completed.

39. In a method as set forth in claim 36 wherein the stored video pixels are in a form indicating at the first clock rate the luminance and chrominance of the pixels and wherein the transferred stored video pixels are converted to a form indicating the primary colors red, green and blue at the second clock rate and wherein the video pixels in the form representing red, green and blue are transferred at the second clock rate to the face of the video monitor at the pixel positions corresponding to the first portion of such face.

40. In a method as set forth in claim 39 wherein the delayed video pixels in the form representing red, green and blue are interpolated to increase the number of the video pixels and wherein the delay of the video pixels at the first clock rate is synchronized with the interpolation of the video signals and wherein the interpolated video signals are transferred at the second clock rate to the face of the video monitor at the pixel positions corresponding to the first portion of such face and wherein the stored video and graphics pixels are in binary form and wherein the video and graphics pixels transferred at the second clock rate are converted to an analog form at the second clock rate and wherein the visual information represented by the video and graphics pixels in the analog form are displayed on the face of the video monitor.

41. In combination for displaying information on a video monitor, a display memory having graphics pixels recorded on a first portion of the display memory and having video pixels recorded on a second portion of the display memory, first means for reading the graphics pixels from the first portion of the display memory at a first frequency, second means for reading the video pixels from the second portion of the display memory at a second frequency different from the first frequency, third means for converting the video pixels at the second frequency to video pixels at the first frequency, and fourth means for providing for the display of the graphics pixels on a first portion of the video monitor at the first frequency and for the display of the video pixels on a second portion of the video monitor at the first frequency.

42. In a combination as set forth in claim 41, the fourth means including control logic means for providing first control signals providing for the display of the graphic pixels on the video monitor and second control signals providing for the display of the video pixels on the video monitor and including multiplexer means responsive to the graphics and video pixels at the first frequency and to the first and second control signals for providing for the display of the graphics pixels at the first frequency on the first portion of the video monitor and for the display at the first frequency of the video pixels on the second portion of the video monitor.

43. In a combination as set forth in claim 42, the display memory storing the graphics and video pixels in binary form, and fifth means for converting to an analog form the graphics and video pixels passing through the multiplexer means in binary form.

44. In a combination as set forth in claim 43, the video pixels stored in the memory being in a compressed form, means for decompressing the video pixels after the conversion of the video pixels to the first frequency and before the introduction of the video pixels at the first frequency to the multiplexer means.

45. In a combination as set forth in claim 42, the video pixels stored in the memory being in a compressed form, fifth means for decompressing the video pixels at the first frequency after the conversion of the video pixels to the first frequency and before the introduction of the video pixels at the first frequency to the multiplexer means, and sixth means for interpolating the decompressed video pixels at the first frequency to provide additional pixels at the first frequency between the decompressed video pixels at the first frequency.

46. In a combination as set forth in claim 41, means for changing the number of the video pixels in accordance with the conversion of the video pixels from the second portion of the display memory from the second frequency to the first frequency.

47. In a method of displaying video information on the face of a video monitor, the steps of:

providing a display memory with graphics information stored on a first portion of the display memory and with video information stored on a second portion of the display memory, transferring the graphics pixels from the first portion of the display memory at a first frequency, transferring the video pixels from the second portion of the display memory at a second frequency different from the first frequency, converting the video pixels at the second frequency to video pixels at the first frequency, and displaying the graphics pixels at the first frequency on a first portion of the video monitor and displaying the video pixels at the first frequency on a second portion of the video monitor different from the first portion of the video monitor.

48. In a method as set forth in claim 47, the steps of:
providing the video pixels in a compressed format in the second portion of the display memory, and
decompressing the video pixels at the first frequency after the conversion of the video pixels to the first frequency.

49. In a method as set forth in claim 47, the steps of:
the video monitor having a plurality of pixel positions,
providing the video pixels and the graphics pixels in a binary form in the display memory,
passing the graphics pixels in the binary form at the first frequency at the pixel positions corresponding to the first portion of the video monitor and passing the video pixels in the binary form at the first frequency at the pixel positions corresponding to the second portion of the video monitor, and
converting the passed graphics and video pixels to an analog form before the passage of such pixels to the video monitor.

50. In a method as set forth in claim 49, the steps of:
providing the video pixels in a compressed format in the second portion of the display memory,
decompressing the video pixels at the first frequency after the conversion of the video pixels to the first frequency and before the passage of the video pixels at the singular positions corresponding to the second portion of the video monitor, and
interpolating the decompressed video pixels at the first frequency to increase the number of video pixels before the passage of the video pixels at the pixel positions corresponding to the second portion of the video monitor.

* * * * *

UNITED STATES PATENT AND TRADEMARK OFFICE
CERTIFICATE OF CORRECTION

PATENT NO. : 5,406,306

DATED : April 11, 1995

INVENTOR(S) : Jonathan I. Siann, Conrad M. Coffey and Jeffrey L. Easley

It is certified that error appears in the above-indentified patent and that said Letters Patent is hereby corrected as shown below:

Delete Drawing Sheet 2 of 3, and substitute therefor the Drawing Sheet, consisting of Figure 3, as shown on the attached page.

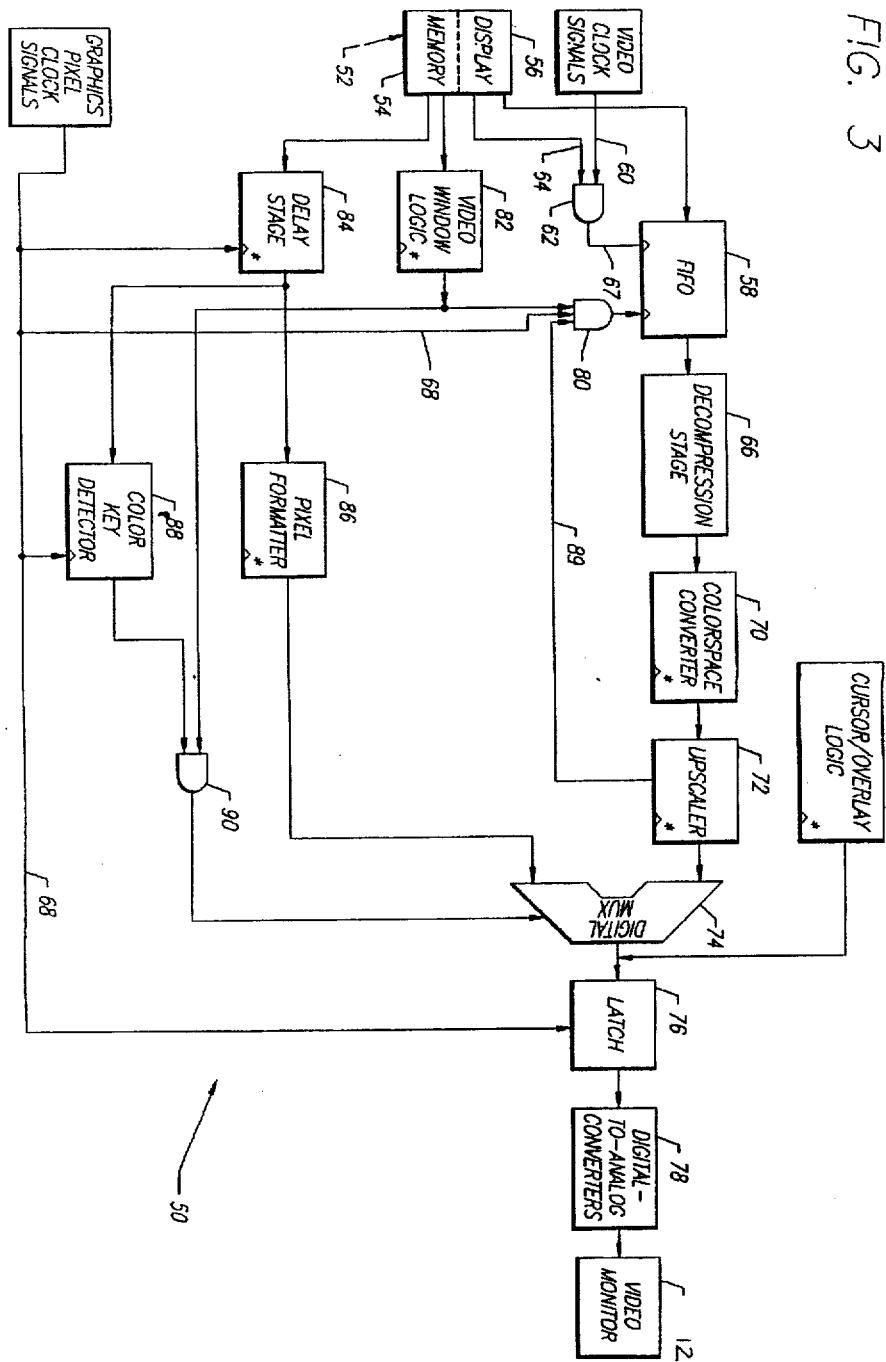

UNITED STATES PATENT AND TRADEMARK OFFICE
CERTIFICATE OF CORRECTION

PATENT NO. : 5,406,306
DATED : APRIL 11, 1995
INVENTOR(S) : JONATHAN I. SIANN, CONRAD M. COFFEY and JEFFREY L. EASLEY It is certified that error appears in the above-identified patent and that said Letters Patent is hereby corrected as shown below:

Column 7, line 46, change "70" to --72--.

Column 8, line 21, change "decoder" to --decodes--.

Column 9, line 58, after "from" delete "to".

Column 10, line 49, after "passing" insert --the--.

Column 11, line 5, delete "the second means and";
line 5, after "sixth means" insert --and--.

Column 13, line 8, after "from" delete "to";
line 24, change "monitor" to memory--.

Column 14, line 11, change "second" to --first--;
line 43, after "from" delete "to".

Column 16, line 13, after "pixels" insert --at the first--.

Column 20, line 12, change "singular" to --pixel--.

Signed and Sealed this

Twentieth Day of May, 1997

BRUCE LEHMAN

*Attest:*

*Attesting Officer*     Commissioner of Patents and Trademarks